US010909014B2

(12) United States Patent
Karino et al.

(10) Patent No.: US 10,909,014 B2
(45) Date of Patent: Feb. 2, 2021

(54) INFORMATION PROCESSING DEVICE, INFORMATION PROCESSING SYSTEM, MONITORING METHOD, AND RECORDING MEDIUM

(71) Applicant: NEC CORPORATION, Tokyo (JP)

(72) Inventors: Shuichi Karino, Tokyo (JP); Kazuhiko Isoyama, Tokyo (JP); Yuji Kobayashi, Tokyo (JP); Yoshiaki Sakae, Tokyo (JP); Hiroki Tagato, Tokyo (JP); Masato Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/487,169

(22) PCT Filed: Feb. 19, 2018

(86) PCT No.: PCT/JP2018/005699
§ 371 (c)(1),
(2) Date: Aug. 20, 2019

(87) PCT Pub. No.: WO2018/155371
PCT Pub. Date: Aug. 30, 2018

(65) Prior Publication Data
US 2020/0057703 A1    Feb. 20, 2020

(30) Foreign Application Priority Data
Feb. 22, 2017    (JP) ................. 2017-031166

(51) Int. Cl.
*G06F 11/30* (2006.01)
*G06F 11/07* (2006.01)
*G06F 11/34* (2006.01)

(52) U.S. Cl.
CPC ........ *G06F 11/3006* (2013.01); *G06F 11/079* (2013.01); *G06F 11/0751* (2013.01);
(Continued)

(58) Field of Classification Search
CPC ......... H04L 67/02; H04L 41/22; H04L 43/08; H04L 41/0604; H04L 63/1441;
(Continued)

(56) References Cited

U.S. PATENT DOCUMENTS

| | | | | |
|---|---|---|---|---|
| 8,102,877 B1 * | 1/2012 | Liu | ...................... | H04L 47/782 370/255 |
| 8,122,122 B1 * | 2/2012 | Clingenpeel | .......... | G06F 21/552 709/203 |

(Continued)

FOREIGN PATENT DOCUMENTS

| | | |
|---|---|---|
| JP | 2002-252614 A | 9/2002 |
| JP | 2004-178336 A | 6/2004 |

(Continued)

OTHER PUBLICATIONS

Written Opinion for PCT/JP2018/005699, dated May 1, 2018.
International Search Report for PCT/JP2018/005699, dated May 1, 2018.

*Primary Examiner* — Djenane M Bayard
(74) *Attorney, Agent, or Firm* — Sughrue Mion, PLLC

(57) ABSTRACT

Provided is an information processing device which is capable of suppressing a deterioration in accuracy of detecting an anomaly and accuracy of analyzing the anomaly, while suppressing an increase in an amount of data to be stored. The information processing system includes anomaly detection unit that collects event data indicating a predetermined event detected in a process of a device to be monitored, determines whether a predetermined index value related to the event exceeds a preset first threshold, and instructs enhanced monitoring of the device to be monitored and the process related to the event when the index value exceeds the first threshold, and collection instruction unit that determines an additional event being an event to be additionally monitored when the enhanced monitoring is (Continued)

instructed, and instructs the device to be monitored, which is subjected to the enhanced monitoring, to monitor the determined additional event.

11 Claims, 5 Drawing Sheets

(52) U.S. Cl.
CPC ...... *G06F 11/3055* (2013.01); *G06F 11/3409* (2013.01); *G06F 2201/86* (2013.01)

(58) Field of Classification Search
CPC ... H04L 67/22; H04L 41/0681; H04L 41/069; H04L 41/5009; H04L 67/1097; H04L 67/125; H04L 67/16; H04L 2463/121; H04L 43/04; H04L 43/14; H04L 43/16; H04L 63/1416; H04L 63/1425; H04L 63/20; H04L 67/10; H04L 67/18; H04L 12/1831; H04L 12/462; H04L 12/4625; H04L 12/4633; H04L 12/467; H04L 29/06; H04L 41/0233; H04L 41/042; H04L 41/046; H04L 41/0609; H04L 41/0654; H04L 41/0686; H04L 41/0806; H04L 41/082; H04L 41/0853; H04L 41/0883; H04L 41/14; H04L 41/142; H04L 41/5012; H04L 41/5032; H04L 41/5035; H04L 41/5045; H04L 41/5051; H04L 41/5054; H04L 41/5058; H04L 43/02; H04L 43/028; H04L 43/045; H04L 43/0817; H04L 43/0852; H04L 43/0888; H04L 43/0894; H04L 43/10; H04L 43/12; H04L 47/10; H04L 47/2441; H04L 47/29; H04L 47/30; H04L 47/32; H04L 47/6225; G06F 2201/86; G06F 11/3409; G06F 11/3476; G06F 2201/81; G06F 2201/865; G06F 2201/88; G06F 11/3466; G06F 2201/815; G06F 2201/87; G06F 11/3006; G06F 11/302; G06F 11/3055; G06F 11/3447; G06F 21/552; G06F 16/29; G06F 11/0751; G06F 11/079; G06F 11/3082; G06F 11/3096; G06F 11/008; G06F 11/0709; G06F 11/0712; G06F 11/0715; G06F 11/301; G06F 11/327; G06F 11/3664; G06F 11/3696; G06F 19/3418; G06F 19/3456; G06F 21/51; G06F 9/455; G06F 9/45558; G06F 11/0703; G06F 11/0706; G06F 11/3024; G06F 11/3065; G06F 16/00; G06F 16/148; G06F 16/24578; G06F 16/27; G06F 16/683; G06F 16/9535; G06F 19/00; G06F 19/326; G06F 1/28; G06F 2119/12; G06F 21/55; G06F 21/554; G06F 2201/835; G06F 30/20; G06F 8/71; G06F 9/44505; G06F 9/542

See application file for complete search history.

(56) References Cited

U.S. PATENT DOCUMENTS

| | | | |
|---|---|---|---|
| 8,997,229 | B1* | 3/2015 | Huang ............... G06F 21/552 726/23 |
| 2011/0055637 | A1* | 3/2011 | Clemm ............ H04L 41/0856 714/39 |
| 2016/0050222 | A1* | 2/2016 | Iyer .................. H04L 43/0876 726/1 |
| 2016/0328247 | A1* | 11/2016 | Uriel ................. G06F 11/3055 |

FOREIGN PATENT DOCUMENTS

| | | |
|---|---|---|
| JP | 2009-106496 A | 5/2009 |
| JP | 2013-030071 A | 2/2013 |
| JP | 2013-196555 A | 9/2013 |
| WO | 2015/140843 A1 | 9/2015 |
| WO | 2015/141220 A1 | 9/2015 |
| WO | 2015/141221 A1 | 9/2015 |

* cited by examiner

Fig.3

| INDEX VALUE | MONITORING TRIGGER INFORMATION | ADDITIONAL EVENT |
|---|---|---|
| ACCESS FREQUENCY | PROCESS a – FILE b | READ/WRITE CONTENT OF FILE b |
| ACCESS FREQUENCY | PROCESS c – PROCESS d | INTER-PROCESS COMMUNICATION CONTENT AND MEMORY ACCESS FROM PROCESSES c AND d |
| DEGREE | PROCESS e – FILE | MEMORY ACCESS FROM PROCESS e |
| * | PROCESS f – LIBRARY g | API CALL FOR LIBRARY g |

INFORMATION PROCESSING DEVICE, INFORMATION PROCESSING SYSTEM, MONITORING METHOD, AND RECORDING MEDIUM

CROSS REFERENCE TO RELATED APPLICATIONS

This application is a National Stage of International Application No. PCT/JP2018/005699 filed Feb. 19, 2018, claiming priority based on Japanese Patent Application No. 2017-031166 filed Feb. 22, 2017, the disclosure of which is incorporated herein in its entirety by reference.

TECHNICAL FIELD

The present invention relates to an information processing device, an information processing system, a monitoring method, and a recording medium.

BACKGROUND ART

Recent information processing systems are deeply involved in social infrastructure, economic activities, daily living, and the like, and thus it is important for each information processing system to smoothly operate. In this regard, an information processing system has a configuration provided with a monitoring device that monitors an operation of the information processing system and determines whether an anomaly occurs, analyzes an anomaly when the anomaly occurs, and notifies a system administrator or the like of an analysis result thereof, an occurrence factor, and the like. As the monitoring device, an information processing device, such as a computer, is generally used.

For example, PTL 1 describes a technique of collecting various events that occur in a host device (a computer, a server, a storage system, a communication control system, a terminal device, etc.) to be monitored, generating a state graph indicating processes related to the various events and a relationship between the processes, and thereby facilitating recognition of a state of each host device. Note that the term "event" refers to a predetermined operation in various processes to be executed by the host device, such as transmission/reception of a message or data between processes, generation or deletion of another process in any process, or an access to a specific file from any process.

Further, PTL 2 describes a technique of generating a state graph indicating the above-described processes related to the events and a relationship between the processes, generating a normal model indicating a condition during a normal operation of a host device to be monitored, and determining whether an operation of the host device is normal based on the generated state graph and normal model.

PTL 3 describes a method of extracting, when anomalies are detected at a plurality of locations in a host device to be monitored, a path common to the anomalies occurring at the plurality of locations from paths on the above-described state graph, and thereby narrowing down a range affected by the anomalies that have occurred.

Note that, as a related art, PTL 4 discloses a technique for extracting operation data for analyzing a failure in an operation management system. Further, PTL 5 discloses a technique for log data collection in medical equipment.

CITATION LIST

Patent Literature

[PTL 1] International Publication No. WO 2015/141220
[PTL 2] International Publication No. WO 2015/141221
[PTL 3] International Publication No. WO 2015/140843
[PTL 4] Japanese Patent Application Laid-Open Publication No. 2004-178336
[PTL 5] Japanese Patent Application Laid-Open Publication No. 2009-106496

SUMMARY OF INVENTION

Technical Problem

In general, a large amount of events occur in the above-described host device to be monitored. Accordingly, in order to reduce a storage capacity and a processing load of an information processing device that collects the events, it is necessary to limit types of events to be collected and an amount of data to be collected. For example, PTL 1 described above describes a technique of reducing an amount of data to be stored in the information processing device by stochastically deleting a stored state graph by using a random number after a lapse of a predetermined time, or by aggregating the same data. PTLs 2 and 3 described above fail to describe any technique for reducing a storage capacity and a processing load of the information processing device.

When more types of events or more pieces of data are stored, the events can be analyzed in detail, and thus it can be expected that accuracy of detecting an anomaly occurring in the host device to be monitored and accuracy of analyzing the anomaly are improved. On the other hand, when the number of events to be collected or the number of state graphs or the like generated based on the events is reduced, there is a possibility that the accuracy of detecting an anomaly occurring in the host device to be monitored and the accuracy of analyzing the anomaly may deteriorate.

In order to suppress a deterioration in accuracy of detecting an anomaly and accuracy of analyzing the anomaly while reducing an amount of data to be stored in the information processing device, for example, an event in which an anomaly can be effectively detected, or an optimum event for analysis may be selected and collected.

Although such a method is effective to detect or analyze already known anomalies, it is difficult for the method to select an event useful for detecting or analyzing unknown anomalies.

The present invention has been made to solve the problems inherent in the above-described background art, and an object of the present invention is to provide an information processing device, an information processing system, a monitoring method, and a recording medium which are capable of suppressing a deterioration in accuracy of detecting an anomaly and accuracy of analyzing the anomaly, while suppressing an increase in an amount of data to be stored.

Solution to Problem

An information processing device according to an exemplary aspect of the present invention includes: anomaly detection means for collecting event data indicating a predetermined event detected in a process of a device to be monitored, determining whether a predetermined index value related to the event exceeds a preset first threshold, based on the collected event data, and instructing enhanced monitoring of the device to be monitored and the process related to the event when the index value exceeds the first threshold; and collection instruction means for determining an additional event being an event to be additionally monitored in the device to be monitored and the process related to the event that has triggered the enhanced monitoring when the enhanced monitoring is instructed by the anomaly detection means, and instructing the device to be monitored, which is subjected to the enhanced monitoring, to monitor the determined additional event.

An information processing system according to an exemplary aspect of the present invention includes: the information processing device; and a monitoring target system including at least one device to be monitored that is a target to be monitored by the information processing device.

An information processing method according to an exemplary aspect of the present invention, performed by a computer, includes: collecting event data indicating a predetermined event detected in a process of a device to be monitored; determining whether a predetermined index value related to the event exceeds a preset first threshold, based on the collected event data; determining enhanced monitoring of the device to be monitored and the process related to the event when the index value exceeds the first threshold; determining an additional event being an event to be additionally monitored in the device to be monitored and the process related to the event that has triggered the enhanced monitoring; and instructing the device to be monitored, which is subjected to the enhanced monitoring, to monitor the determined additional event.

A computer readable storage medium according to an exemplary aspect of the present invention records thereon a program causing a computer to perform processes including: collecting event data indicating a predetermined event detected in a process of a device to be monitored; determining whether a predetermined index value related to the event exceeds a preset first threshold, based on the collected event data; determining enhanced monitoring of the device to be monitored and the process related to the event when the index value exceeds the first threshold; determining an additional event being an event to be additionally monitored in the device to be monitored and the process related to the event that has triggered the enhanced monitoring; and instructing the device to be monitored, which is subjected to the enhanced monitoring, to monitor the determined additional event.

Advantageous Effects of Invention

According to the present invention, it is possible to suppress a deterioration in accuracy of detecting an anomaly to be detected by an information processing device and accuracy of analyzing the anomaly, while suppressing an increase in an amount of data to be stored in the information processing device.

BRIEF DESCRIPTION OF DRAWINGS

FIG. 3 is a graph illustrating an example of a determination table included in a collection instruction unit illustrated in FIG. 2;

EXAMPLE EMBODIMENT

Next, the present invention will be described by using the drawings.

Figure 1:
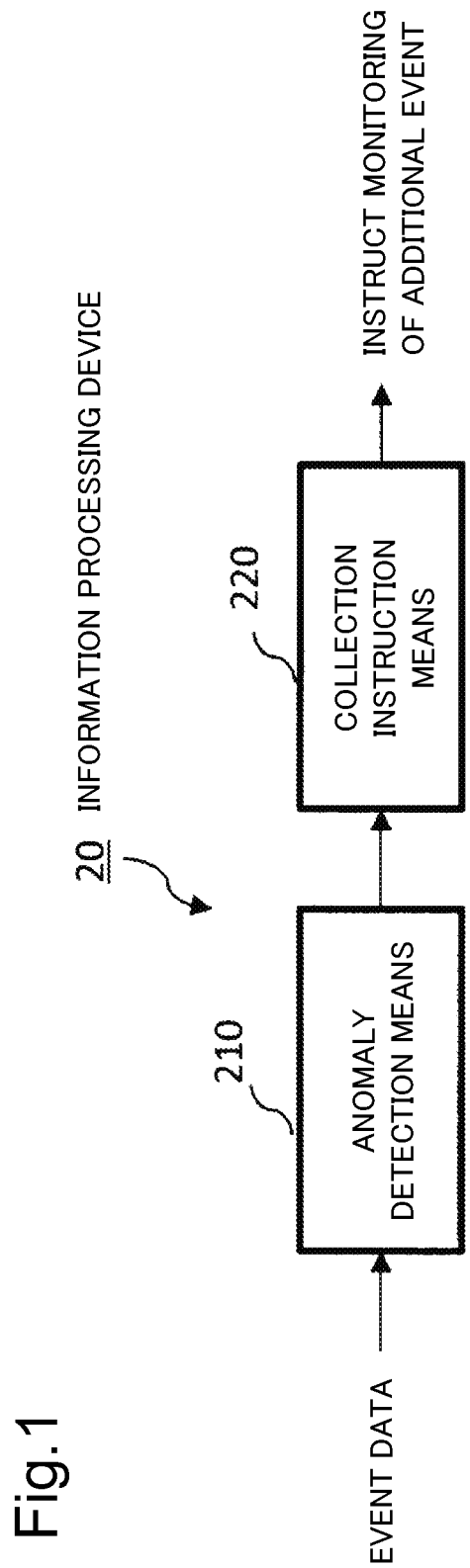
FIG. 1 is a block diagram illustrating a configuration example of an information processing device according to the present invention.

Note that each unidirectional arrow illustrated in the drawings simply indicates a direction of data flow, and thus is not intended to eliminate bidirectionality of the arrow. FIG. 1 is a block diagram illustrating a configuration example of an information processing device according to the present invention.

As illustrated in FIG. 1, an information processing device 20 according to the present invention includes an anomaly detection means 210 for collecting event data indicating a predetermined event detected in a process of a device to be monitored and determines whether an anomaly has occurred in each device to be monitored, based on the collected event data, and a collection instruction means 220 for instructing the device to be monitored to monitor an additional event.

Figure 2:
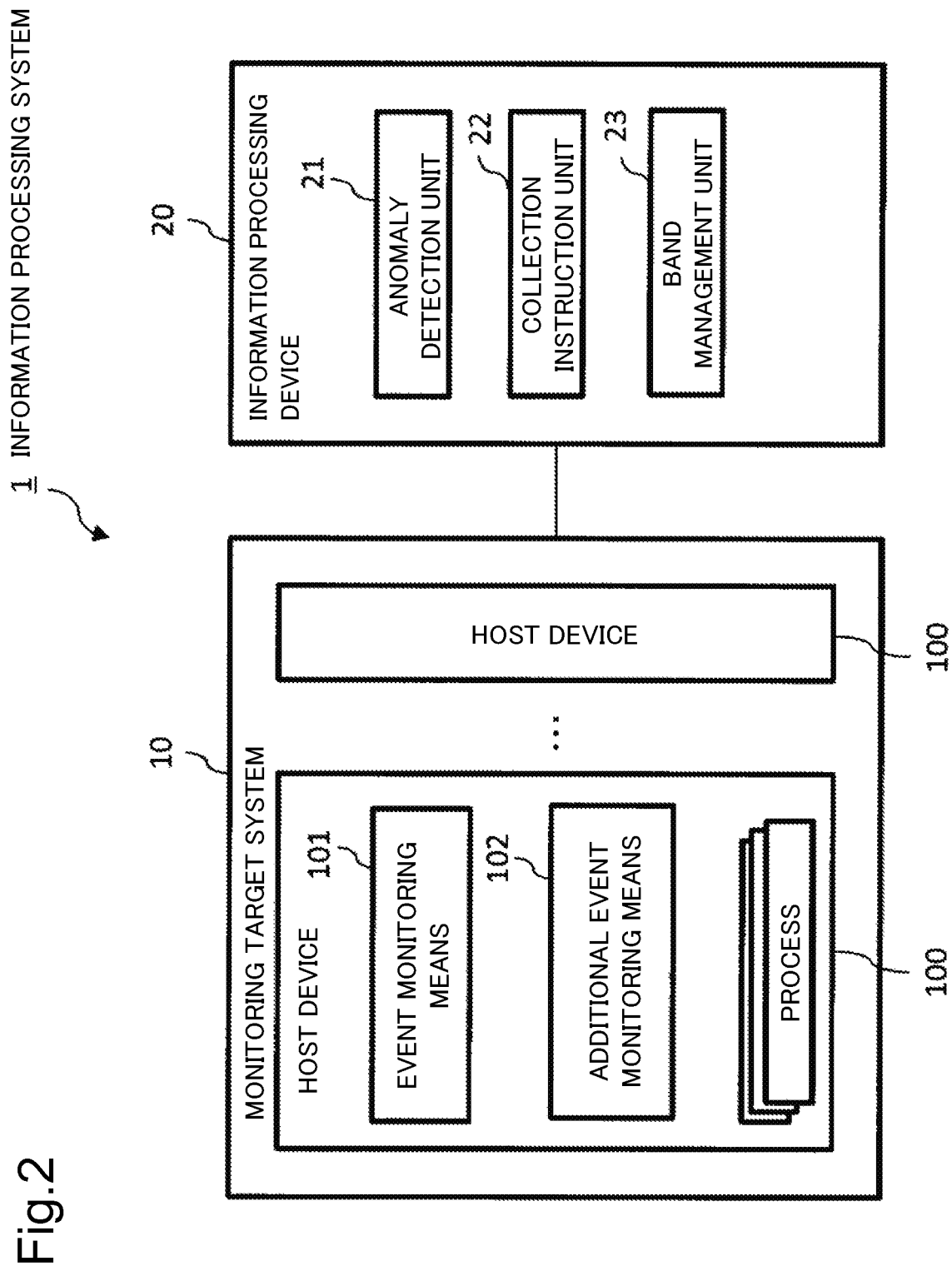
FIG. 2 is a block diagram illustrating a configuration example of an information processing system according to the present invention.

FIG. 2 is a block diagram illustrating a configuration example of an information processing system according to the present invention.

An information processing system 1 illustrated in FIG. 2 includes a monitoring target system 10 including at least one host device 100 to be monitored, and an information processing device 20 that monitors each host device 100 included in the monitoring target system 10.

Each host device 100 is a device that executes at least one process (processing). The host device 100 includes an event monitoring means 101 for monitoring an event that occurs in the process, and an additional event monitoring means 102 for monitoring an event different from the event monitored by the event monitoring means 101. The host device 100 is an example of the device to be monitored as described above and is implemented on a computer, a server, a storage system, a communication control system, a terminal device, or the like.

The event monitoring means 101 monitors whether a normally occurring event (hereinafter, referred to as a standard event) occurs in each host device 100. The term "monitoring" of the standard event refers to processing of detecting the occurrence of the standard event and transmitting, to the information processing device 20, standard event data indicating the detected standard event. Examples of the standard event include generation or termination of a new process by a process, opening or closing of a file by a process, generation or deletion of a file by a process, and inter-process communication in each host device 100 or between the host devices 100. The event monitoring means 101 always monitors whether the standard event has occurred during operation of the monitoring target system 10.

The event monitoring means 101 can be implemented by a well-known monitoring agent including functions, such as a process generation monitoring means, a file access monitoring means, an in-host inter-process communication monitoring means, and an inter-host inter-process communication monitoring means which are described in PTL 1 described above.

The additional event monitoring means 102 monitors whether an event to be added (hereinafter, referred to as an additional event) that is not monitored by the event monitoring means 101 has occurred. The term "monitoring" of the additional event refers to processing of detecting the occurrence of the additional event and transmitting, to the information processing device 20, additional event data indicating the detected additional event. The additional event monitoring means 102 starts or terminates monitoring of the additional event in response to an instruction from the information processing device 20.

It is assumed that the additional event to be monitored by the additional event monitoring means 102 is an event that occurs more frequently than the standard event and has a processing load higher than that of the standard event, or an event that has a large amount of data and requires a large communication band or a large storage capacity. Examples of the additional event include an access to a memory from a process, a library routine call from a process, and the like. The additional event monitoring means 102 can be implemented by a function provided by system software, such as an operating system (OS) or a system library.

As described above, the standard event data indicating the standard event detected by the event monitoring means 101 and the additional event data indicating the additional event detected by the additional event monitoring means 102 are transmitted to the information processing device 20 through a communication device which is not illustrated. In the communication between the monitoring target system 10 and the information processing device 20, a well-known wired or wireless communication method may be used.

As illustrated in FIG. 2, the information processing device 20 includes an anomaly detection unit 21 that determines whether an anomaly has occurred in each host device 100 based on the collected standard event data, a collection instruction unit 22 that instructs the additional event monitoring means 102 included in the host device 100 to start or terminate monitoring of the additional event, and a band management unit 23 that manages a communication band for each host device 100 to be used for transmission/reception of the standard event data and the additional event data. The anomaly detection unit 21 is an example of the anomaly detection means 210 illustrated in FIG. 1, and the collection instruction unit 22 is an example of the collection instruction means 220 illustrated in FIG. 1. The band management unit 23 is an example of a band management means.

The anomaly detection unit 21 uses the event monitoring means 101 and the additional event monitoring means 102 to respectively collect the standard event data and the additional event data which are detected in each host device 100.

Further, the anomaly detection unit 21 determines whether an anomaly has occurred in each host device 100, based on the collected standard event data. The anomaly detection unit 21 includes, for example, a graphing unit and a normal model generation unit described in PTL 2 described above. The anomaly detection unit 21 may compare a state graph for each process that is generated by the graphing unit with a normal model for each host device that is generated by the normal model generation unit, to determine whether an anomaly has occurred in each host device 100.

The state graph is expressed as a diagram (graph) or a table in which one or more processes to be executed by each host device 100 is represented by a vertex (a node or a node point) and a connection relationship (a link or a branch) between processes is represented by an edge. In the state graph, the standard event data indicating the standard event that has occurred in each process (vertex) or between processes (edges) is recorded in association with a vertex or edge. The normal model is a set of conditions to be satisfied by the host device 100 during a normal operation. Functions of the graphing unit and the normal model generation unit are described in PTL 2 described above, and thus detailed descriptions thereof are omitted.

The anomaly detection unit 21 according to this example embodiment uses two levels of thresholds for determination as to whether an anomaly has occurred. A first threshold is set to a preset determination level. The determination level is used to determine whether to start enhanced monitoring of the host device 100. A second threshold is set to a determination level higher than the first threshold. The determination level is used to determine whether to notify an administrator or the like of the information processing system 1 of the occurrence of an anomaly in the host device 100. The term "enhanced monitoring" used herein refers to processing of collecting the standard event data indicating the standard event detected by the event monitoring means 101 included in the host device 100, and also collecting the additional event data indicating the additional event detected by the additional event monitoring means 102.

The first threshold and the second threshold are preset by the administrator or the like of the information processing system 1 for a predetermined index value related to the standard event. For example, when occurrence of data transmission/reception between two processes x and y is monitored as the standard event and an occurrence frequency of the data transmission/reception is used as the index value, the first threshold and the second threshold are set for the occurrence frequency.

Specifically, when an average value of occurrence frequencies of data transmission/reception between the processes x and y in the normal model is 6.0 and a standard deviation is 3.0, for example, occurrence frequencies 4.0 and 8.0 are each set as the first threshold, and occurrence frequencies 3.0 and 9.0 are each set as the second threshold.

In this case, when the occurrence frequency of data transmission/reception between the processes x and y is equal to or more than 3.0 and less than 4.0, or more than 8.0 and equal to or less than 9.0, the anomaly detection unit 21 instructs the collection instruction unit 22 to enhance monitoring of the processes x and y, or the host device 100 that executes the processes x and y.

Further, when the occurrence frequency of data transmission/reception between the processes x and y is less than 3.0 or more than 9.0, the anomaly detection unit 21 determines that an anomaly has occurred in the host device 100 that executes the processes x and y, and displays information on a display device or the like, which is not illustrated, to thereby notify the administrator or the like of the information processing system 1 of the occurrence of the anomaly in the corresponding host device 100.

When the collection instruction unit 22 is instructed to enhance monitoring, the anomaly detection unit 21 notifies the collection instruction unit 22 of, for example, a state graph to be subjected to enhanced monitoring, each position on the state graph, and the index value used for determination. As described above, each position on the state graph indicates a process or a process pair in which the standard event that has triggered enhanced monitoring has occurred. Hereinafter, information indicating a process, a process pair, or the like to be subjected to enhanced monitoring is also referred to as "monitoring trigger information".

When enhanced monitoring is instructed from the anomaly detection unit 21, the collection instruction unit 22 identifies the notified state graph and a vertex or edge indicated by the position on the state graph, to thereby discriminate a target (host device and process) to be subjected to enhanced monitoring. Further, the collection instruction unit 22 determines the additional event to be additionally collected, based on the position (=monitoring trigger information) on the state graph and the index value notified from the anomaly detection unit 21. The collection instruction unit 22 may determine the additional event by using a preliminarily generated determination table indicating, for example, relationships of the additional event with the index value and the monitoring trigger information.

FIG. 3 is a graph illustrating an example of a determination table included in the collection instruction unit illustrated in FIG. 2.

As illustrated in FIG. 3, for example, when the index value indicates an "access frequency" and monitoring trigger information indicates "process a-file b", the collection instruction unit 22 determines a collection of data, which is read from the file b by the process a, or is written into the file b by the process a, to be the additional event.

Further, when the index value indicates the "access frequency" and the monitoring trigger information indicates "process c-process d", the collection instruction unit 22 determines the collection of data transmitted/received between the processes c and d to be the additional event, and determines an access to the memory from the processes c and d to be the additional event. This process is performed for monitoring data transmission/reception between the processes c and d by using a shared memory.

Further, when the index value indicates the "degree" of a vertex and the monitoring trigger information indicates "process e-file", the collection instruction unit 22 determines an access to the memory from the process e to be the additional event. Note that the term "degree" generally refers to the number of edges contacting each other at the vertex of the state graph. In this case, the degree indicates the number of files to be accessed from the vertex (process e).

The item including the index value "*" illustrated in FIG. 3 indicates an example of the additional event when an arbitrary condition is generated. For example, as illustrated in FIG. 3, when a library g that is not accessed by the process f in a normal state is defined (process f-library g) as a condition (monitoring trigger information), the collection instruction unit 22 determines an Application Programming Interface (API) call for the library g to be the additional event when the library g is opened by the process f.

When the additional event is determined in the manner as described above, the collection instruction unit 22 instructs the additional event monitoring means 102 of the host device 100 to be subjected to enhanced monitoring to monitor the determined additional event. Further, when the additional event is determined, the collection instruction unit 22 estimates the amount of data indicating the additional event. The amount of data indicating the additional event may be estimated based on, for example, a length of additional event data preliminarily defined for each additional event and an occurrence frequency of the additional event data.

When the amount of data indicating the additional event is estimated, the collection instruction unit 22 notifies the band management unit 23 of the host device 100 in which the additional event is monitored and the estimated amount of data indicating the additional event, and instructs the band management unit 23 to change a communication band to be allocated to the host device 100.

When the collection instruction unit 22 instructs the band management unit 23 to change the communication band to be allocated to the host device 100, the band management unit 23 increases the communication band to be allocated to the host device 100 in which the additional event is monitored, based on the notified amount of data indicating the additional event.

In general, the communication band used for data transmission/reception between the information processing device 20 and the monitoring target system 10 is finite. Accordingly, when the communication band to be allocated to any one of the host devices 100, it is necessary to reduce the communication band to be allocated to the other host devices 100 by the amount corresponding to the increased communication band. As the host device 100 for which the communication band is reduced, for example, the host device 100 that does not include any vertex or edge that contacts the vertex or edge on the state graph related to the monitoring trigger information may be selected. When there is no such a host device 100, the band management unit 23 may reduce the communication band for the host device 100 that includes a process that does not contact any vertex or edge on the state graph related to the monitoring trigger information. When the vertex or edge of all processes contacts the vertex or edge on the state graph related to the monitoring trigger information, the band management unit 23 may reduce the communication band for the host device 100 including a process in which an anomaly has not occurred up to this time.

When monitoring of the additional event is instructed from the information processing device 20, the host device 100 starts monitoring of the designated additional event by using the additional event monitoring means 102 in response to the instruction. Further, the host device 100 transmits the detected standard event data and additional event data to the information processing device 20, while adjusting the amount of data to be transmitted to the information processing device 20 in such a way that the amount of data falls within the communication band notified from the information processing device 20.

Note that when an index value which triggers enhanced monitoring is lower than a third threshold, which is lower than the preset first threshold described above, or when a predetermined time has elapsed in a state where the index value is lower than the third threshold, the anomaly detection unit 21 notifies the collection instruction unit 22 to terminate enhanced monitoring. In this case, the collection instruction unit 22 instructs the host device 100 to terminate processing for enhanced monitoring, i.e., monitoring of the additional event by using the additional event monitoring means 102. When the information processing device 20 instructs the host device 100 to terminate monitoring of the additional event, the host device 100 terminates monitoring of the additional event by using the additional event monitoring means 102 in response to the instruction.

Figure 4:
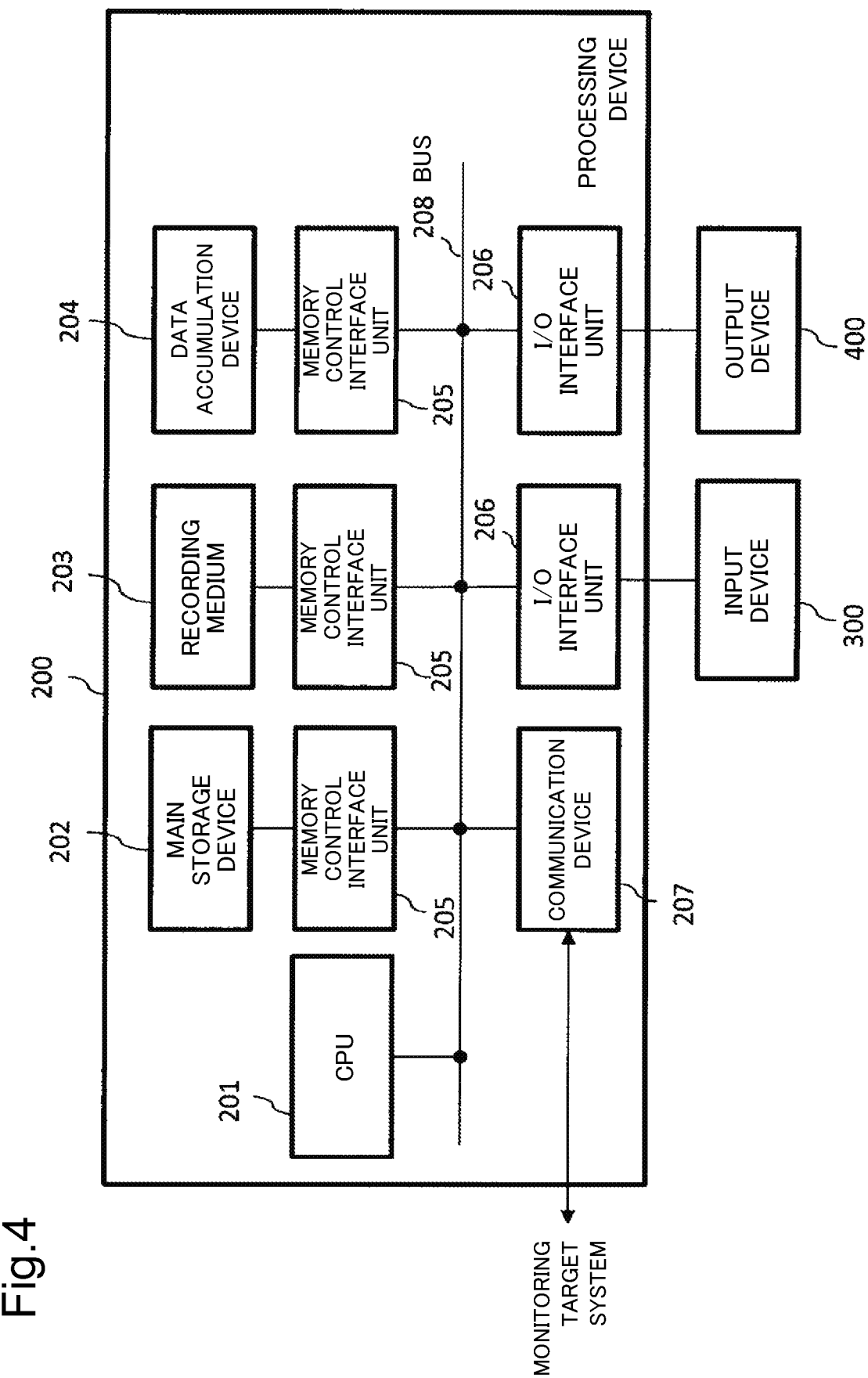
FIG. 4 is a block diagram illustrating a configuration example of a computer for implementing the information processing device illustrated in FIGS. 1 and 2.

The anomaly detection means 210 and the collection instruction means 220 included in the information processing device 20 illustrated in FIG. 1 and the anomaly detection unit 21, the collection instruction unit 22, and the band management unit 23 included in the information processing device 20 illustrated in FIG. 2 can be implemented by, for example, a computer illustrated in FIG. 4.

FIG. 4 is a block diagram illustrating a configuration example of a computer for implementing the information processing device illustrated in FIGS. 1 and 2.

The computer illustrated in FIG. 4 includes a processing device 200 that executes predetermined processing based on a program, an input device 300 that is used to input a command, information, or the like to the processing device 200, and an output device 400 that is used to output a processing result of the processing device 200.

As the input device 300, a pointing device, such as a mouse or a trackball, a keyboard, a touch pad, a touch panel, or the like is used. As the output device 400, a display device such as a display or a monitor, a printer, or the like is used.

The processing device 200 includes a central processing unit (CPU) 201, a main storage device 202 that temporarily holds information necessary for processing of the CPU 201, a recording medium 203 on which programs for causing the CPU 201 to execute processing are recorded, a data accumulation device 204 that stores the standard event data and additional event data transmitted from each host device 100, the state graph generated based on the standard event data, the normal model for each host device 100, and the like, memory control interface units 205 that control data transfer to/from the main storage device 202, the recording medium 203, and the data accumulation device 204, respectively, I/O interface units 206 serving as an interface device to the input device 300 and the output device 400, respectively, and a communication device 207 that transmits/receives data or information to/from each host device 100 included in the monitoring target system 10. These devices are connected to each other via a bus 208. The data accumulation device 204 need not be provided in the processing device 200, and may be provided separately from the processing device 200.

The processing device 200 executes processing based on programs recorded on the recording medium 203, thereby implementing functions of the anomaly detection means 210 and the collection instruction means 220, or functions of the anomaly detection unit 21, the collection instruction unit 22, and the band management unit 23. The recording medium 203 may be a magnetic disk, a semiconductor memory, an optical disk, or other recording media.

Figure 5:
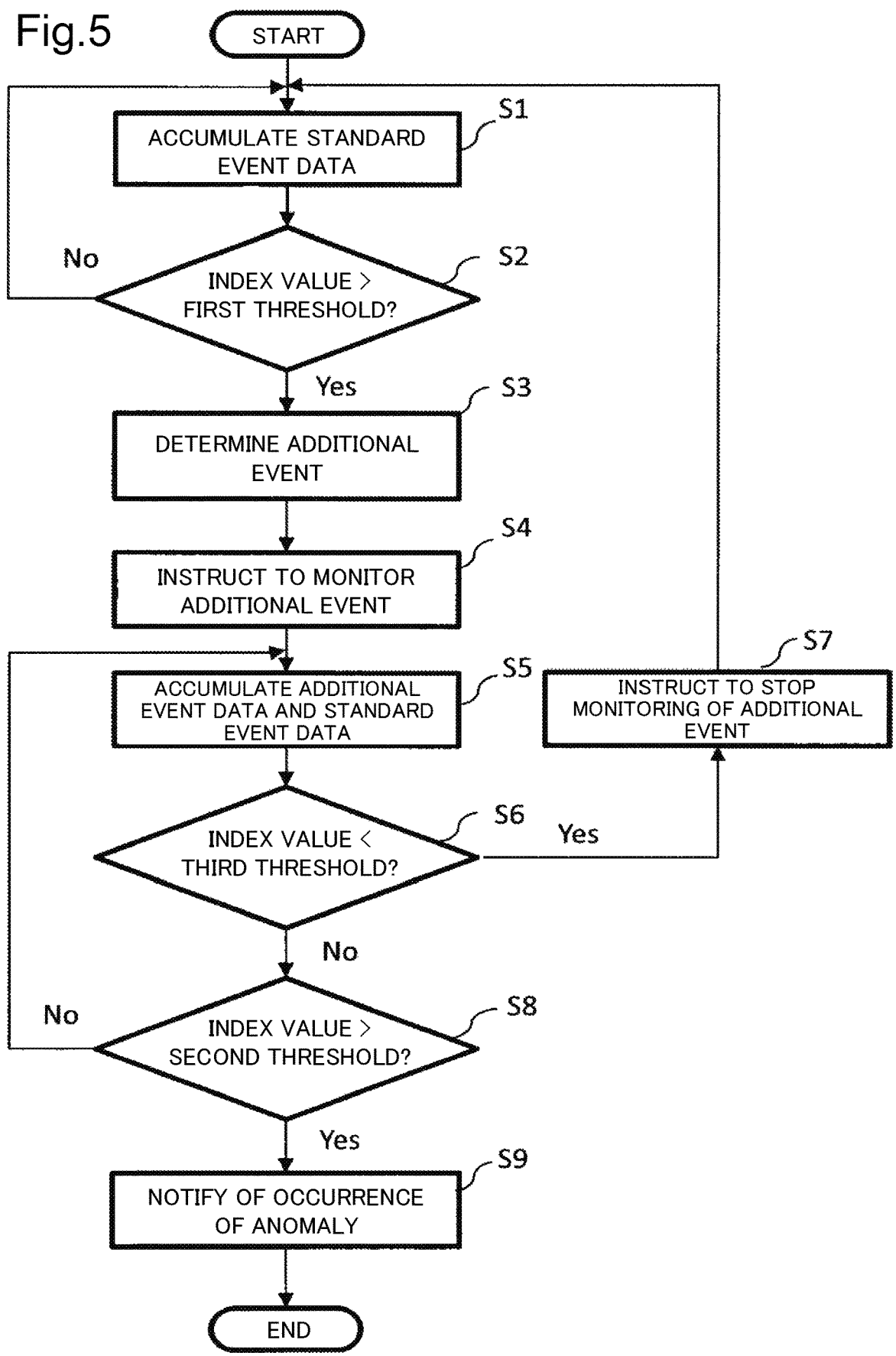
FIG. 5 is a flowchart illustrating an example of a processing procedure for the information processing device according to the present invention.

FIG. 5 is a flowchart illustrating an example of a processing procedure for the information processing device according to the present invention.

In the information processing system 1 illustrated in FIG. 2, when the operation of the monitoring target system 10 is started, each host device 100 uses the event monitoring means 101 included in the host device to monitor whether a predetermined standard event has occurred, and when the event monitoring means 101 detects the standard event, each host device 100 transmits the standard event data indicating the detected standard event to the information processing device 20.

As illustrated in FIG. 5, when the standard event data are transmitted from each host device 100 of the monitoring target system 10, the information processing device 20 accumulates the standard event data by using the anomaly detection unit 21 (step S1). In this case, the information processing device 20 may generate the above-described state graph based on the accumulated standard event data by using the anomaly detection unit 21.

Next, the information processing device 20 uses the anomaly detection unit 21 to determine whether the index value related to each standard event exceeds the first threshold set as the index value (step S2). When there is no index value that exceeds the first threshold, the information processing device 20 repeatedly performs the processing of steps S1 and S2.

When there is an index value that exceeds the first threshold, the information processing device 20 determines the additional event to be additionally monitored in the process and the host device 100 related to the index value that exceeds the first threshold, by using the collection instruction unit 22 (step S3), and instructs the host device 100 to be subjected to enhanced monitoring (hereinafter, referred to as a monitoring enhanced host device) to monitor the determined additional event (step S4).

When the information processing device 20 instructs the monitoring enhanced host device to monitor the additional event, the additional event monitoring means 102 is used to monitor the designated additional event in response to the instruction. In this case, the monitoring enhanced host device transmits, to the information processing device 20, the standard event data indicating the standard event detected by using the event monitoring means 101 and the additional event data indicating the additional event detected by using the additional event monitoring means 102.

The information processing device 20 uses the anomaly detection unit 21 to accumulate the standard event data and the additional event data transmitted from the monitoring enhanced host device (step S5).

Next, the information processing device 20 uses the anomaly detection unit 21 to determine whether the index value related to the standard event that has triggered enhanced monitoring in the monitoring enhanced host device is lower than the third threshold (step S6). When the index value is equal to or more than the third threshold, the information processing device 20 moves to processing of step S8.

On the other hand, in the monitoring enhanced host device, when the index value related to the standard event that has triggered enhanced monitoring is lower than the third threshold, the information processing device 20 uses the collection instruction unit 22 to instruct the monitoring enhanced host device to terminate monitoring of the additional event (step S7), and then returns to the processing of step S1 and repeatedly performs the processing of steps S1 to S6.

In step S8, the information processing device 20 uses the anomaly detection unit 21 to determine whether the index value related to the standard event that has triggered enhanced monitoring in the monitoring enhanced host device exceeds the second threshold. When the index value does not exceed the second threshold, the information processing device 20 repeatedly performs the processing of steps S5 to S8.

On the other hand, in the monitoring enhanced host device, when the index value related to the standard event that has triggered enhanced monitoring further exceeds the second threshold, the information processing device 20 uses the anomaly detection unit 21 to determine that an anomaly has occurred in the monitoring enhanced host device. Further, the information processing device 20 outputs information indicating the occurrence of the anomaly by using an output device, such as a display device, thereby notifying the administrator or the like of the information processing system 1 of the occurrence of the anomaly in the monitoring enhanced host device (step S9).

When being instructed from the administrator or the like of the information processing system 1 to output the standard event data and the additional event data related to the monitoring enhanced host device of which the occurrence of the anomaly has been notified, the information processing device 20 outputs the standard event data and additional event data collected from the monitoring enhanced host device by using an output device, such as a display device. Further, when the information processing device 20 includes an event analysis means (not illustrated), the information processing device 20 uses an output device, such as a display device, to output analysis results of the standard event data and additional event data collected from the monitoring enhanced host device of which the occurrence of the anomaly has been notified, thereby notifying the administrator or the like of the information processing system 1 of the analysis results.

According to the present invention, the information processing device 20 determines whether the predetermined index value related to the standard event that has occurred in the monitoring target system 10 exceeds the first threshold, and causes the monitoring target system 10 to monitor whether the additional event has occurred in the process or the host device 100 related to the standard event in which the index value exceeds the first threshold.

Accordingly, since only the standard event is monitored for the process or the host device 100 in which the index value does not exceed the first threshold, an increase in the amount of data to be collected and stored in the information processing device 20 is suppressed.

On the other hand, the monitoring target system 10 is caused to monitor whether the additional event has occurred in the process or the host device 100 in which occurrence of an anomaly is suspected since the index value exceeds the first threshold, whereby the information processing device 20 collects more detailed event data related to the process or the host device 100. Therefore, it can be expected that the accuracy of detecting an anomaly occurring in the host device 100 by using the information processing device 20 and the accuracy of analyzing the anomaly by using the information processing device 20 are improved. Consequently, it is possible to suppress a deterioration in the accuracy of detecting an anomaly occurring in the monitoring target system 10 and the accuracy of analyzing the anomaly, while suppressing an increase in the amount of data to be stored in the information processing device 20.

While the invention has been particularly shown and described with reference to exemplary embodiments thereof, the present invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

An information processing device comprising:

anomaly detection means for collecting event data indicating a predetermined event detected in a process of a device to be monitored, determining whether a predetermined index value related to the event exceeds a preset first threshold, based on the collected event data, and instructing enhanced monitoring of the device to be monitored and the process related to the event when the index value exceeds the first threshold; and collection instruction means for determining an additional event being an event to be additionally monitored in the device to be monitored and the process related to the event that has triggered the enhanced monitoring when the enhanced monitoring is instructed by the anomaly detection means, and instructing the device to be monitored, which is subjected to the enhanced monitoring, to monitor the determined additional event.

(Supplementary Note 2)

The information processing device according to Supplementary Note 1, wherein the anomaly detection means determines whether an index value that exceeds the first threshold further exceeds a second threshold being higher than the preset first threshold, and, when the index value exceeds the second threshold, the anomaly detection means determines that an anomaly occurs in the device to be monitored related to the event, and outputs information indicating that the anomaly occurs.

(Supplementary Note 3)

The information processing device according to Supplementary Note 1 or 2, further comprising band management means for managing a communication band being used for transmitting and receiving data indicating the event and the additional event to/from the device to be monitored, wherein, when the additional event is determined, the collection instruction means estimates an amount of data indicating the additional event, notifies the band management means of the device to be monitored that monitors the additional event and the estimated amount of data indicating the additional event, and instructs the band management means to change a communication band to be allocated to the device to be monitored, and, when the collection instruction means instructs the band management means to change the communication band to be allocated to the device to be monitored, the bandwidth management means increases a communication band to be allocated to the device to be monitored that monitors the additional event, based on the estimated amount of data indicating the additional event.

(Supplementary Note 4)

The information processing device according to any one of Supplementary Notes 1 to 3, wherein the collection instruction means determines the additional event by using a preliminarily generated determination table indicating a relationship of the additional event with information indicating a process or a process pair in which the event that triggers the enhanced monitoring has occurred and the index value.

(Supplementary Note 5)

An information processing system comprising:

the information processing device according to any one of Supplementary Notes 1 to 4; and a monitoring target system including at least one device to be monitored that is a target to be monitored by the information processing device.

(Supplementary Note 6)

The information processing system according to Supplementary Note 5, wherein the device to be monitored includes:

event monitoring means for monitoring the event occurring in the process; and additional event monitoring means for monitoring the additional event different from the event monitored by the event monitoring means.

(Supplementary Note 7)

An information processing method performed by a computer comprising:

collecting event data indicating a predetermined event detected in a process of a device to be monitored;

determining whether a predetermined index value related to the event exceeds a preset first threshold, based on the collected event data;

determining enhanced monitoring of the device to be monitored and the process related to the event when the index value exceeds the first threshold;

determining an additional event being an event to be additionally monitored in the device to be monitored and the process related to the event that has triggered the enhanced monitoring; and instructing the device to be monitored, which is subjected to the enhanced monitoring, to monitor the determined additional event.

(Supplementary Note 8)

The information processing method according to Supplementary Note 7 performed by the computer further comprising:

determining whether an index value that exceeds the first threshold further exceeds a second threshold being higher than the preset first threshold; and when the index value exceeds the second threshold, determining that an anomaly occurs in the device to be monitored related to the event, and outputting information indicating that the anomaly occurs.

(Supplementary Note 9)

The information processing method according to Supplementary Note 7 or 8 performed by the computer further comprising:

when the additional event is determined, estimating an amount of data indicating the additional event, and increasing a communication band to be allocated to the device to be monitored that monitors the additional event, based on the estimated amount of data indicating the additional event.

(Supplementary Note 10)

The information processing method according to any one of Supplementary Notes 7 to 9 performed by the computer, wherein the additional event is determined by using a preliminarily generated determination table indicating a relationship of the additional event with information indicating a process or a process pair in which the event that triggers the enhanced monitoring has occurred and the index value.

(Supplementary Note 11)

A computer readable storage medium recording thereon a program causing a computer to perform processes comprising:

collecting event data indicating a predetermined event detected in a process of a device to be monitored;

determining whether a predetermined index value related to the event exceeds a preset first threshold, based on the collected event data;

determining enhanced monitoring of the device to be monitored and the process related to the event when the index value exceeds the first threshold;

determining an additional event being an event to be additionally monitored in the device to be monitored and the process related to the event that has triggered the enhanced monitoring; and instructing the device to be monitored, which is subjected to the enhanced monitoring, to monitor the determined additional event.

(Supplementary Note 12)

The computer readable storage medium recording thereon the program according to Supplementary Note 11, causing the computer to perform the processes, further comprising:

determining whether an index value that exceeds the first threshold further exceeds a second threshold being higher than the preset first threshold; and when the index value exceeds the second threshold, determining that an anomaly occurs in the device to be monitored related to the event, and outputting information indicating that the anomaly occurs.

(Supplementary Note 13)

The computer readable storage medium recording thereon the program according to Supplementary Note 11 or 12, causing the computer to perform the processes, further comprising:

when the additional event is determined, estimating an amount of data indicating the additional event, and increasing a communication band to be allocated to the device to be monitored that monitors the additional event, based on the estimated amount of data indicating the additional event.

(Supplementary Note 14)

The computer readable storage medium recording thereon the program according to any one of Supplementary Notes 11 to 13, causing the computer to perform the processes, wherein the additional event is determined by using a preliminarily generated determination table indicating a relationship of the additional event with information indicating a process or a process pair in which the event that triggers the enhanced monitoring has occurred and the index value.

REFERENCE SIGNS LIST

1 Information processing system
10 Monitoring target system
20 Information processing device
21 Anomaly detection unit
22 Collection instruction unit
23 Band management unit
101 Event monitoring means
102 Additional event monitoring means
200 Processing device
201 CPU
202 Main storage device
203 Recording medium
204 Data accumulation device
205 Memory control interface unit
206 I/O interface unit
207 Communication device
208 Bus
210 Anomaly detection means
220 Collection instruction means
300 Input device
400 Output device

The invention claimed is:

1. An information processing device comprising:
a memory storing instructions; and
one or more processors configured to execute the instructions to:
collect event data indicating an event corresponding to a predetermined event is detected in a process of a device to be monitored,
determine whether a predetermined index value related to the detected event exceeds a preset first threshold, based on the collected event data,
determine to perform enhanced monitoring of the device to be monitored and the process related to the detected event when the predetermined index value exceeds the first threshold,
determine an additional event to be additionally monitored in the device to be monitored and the process related to the detected event that has triggered the enhanced monitoring, and
instruct the device to be monitored, which is subjected to the enhanced monitoring, to monitor the determined additional event, wherein the one or more processors are further configured to execute the instructions to:
when the additional event is determined, estimate an amount of data related to the additional event, and
increase a communication band to be allocated to the device to be monitored that monitors the additional event, based on the estimated amount of data related to the additional event.

2. The information processing device according to claim 1, wherein the one or more processors are further configured to execute the instructions to:
determine whether the predetermined index value exceeds a second threshold that is higher than the preset first threshold, and
when the index value exceeds the second threshold, determine that an anomaly occurs in the device to be monitored related to the event, and output information indicating that the anomaly has occurred.

3. The information processing device according to claim 1, wherein the one or more processors are further configured to execute the instructions to:
determine the additional event by using a preliminarily generated determination table indicating a relationship of the additional event with information indicating a process or a process pair in which the detected event that triggers the enhanced monitoring has occurred and the index value.

4. An information processing system comprising:
the information processing device according to claim 1; and
a monitoring target system including at least one device to be monitored that is a target to be monitored by the information processing device.

5. The information processing system according to claim 4, wherein the device to be monitored includes:
a memory storing instructions; and
one or more processors configured to execute the instructions to:
monitor the event occurring in the process; and
monitor the additional event, which is different from the event.

6. An information processing method performed by a computer, the information processing method comprising:
collecting event data indicating an event corresponding to a predetermined event is detected in a process of a device to be monitored;
determining whether a predetermined index value related to the detected event exceeds a preset first threshold, based on the collected event data;
determining to perform enhanced monitoring of the device to be monitored and the process related to the detected event when the predetermined index value exceeds the first threshold;
determining an additional event to be additionally monitored in the device to be monitored and the process related to the detected event that has triggered the enhanced monitoring; and
instructing the device to be monitored, which is subjected to the enhanced monitoring, to monitor the determined additional event, wherein the information processing method further comprises:
when the additional event is determined, estimating an amount of data indicating the additional event, and
increasing a communication band to be allocated to the device to be monitored that monitors the additional event, based on the estimated amount of data indicating the additional event.

7. The information processing method according to claim 6, further comprising:
determining whether the predetermined index value exceeds a second threshold that is higher than the preset first threshold; and
when the index value exceeds the second threshold, determining that an anomaly occurs in the device to be monitored related to the event, and outputting information indicating that the anomaly has occurred.

8. The information processing method according to claim 6, wherein the additional event is determined by using a preliminarily generated determination table indicating a relationship of the additional event with information indicating a process or a process pair in which the detected event that triggers the enhanced monitoring has occurred and the index value.

9. A non-transitory computer readable storage medium comprising computer executable instructions that, when executed by a processor, cause the processor to:
collect event data indicating an event corresponding to a predetermined event is detected in a process of a device to be monitored;
determine whether a predetermined index value related to the detected event exceeds a preset first threshold, based on the collected event data;
determine to perform enhanced monitoring of the device to be monitored and the process related to the detected event when the predetermined index value exceeds the first threshold;
determine an additional event to be additionally monitored in the device to be monitored and a process related to the detected event that has triggered the enhanced monitoring; and
instruct the device to be monitored, which is subjected to the enhanced monitoring, to monitor the determined additional event, wherein the computer-executable instructions are further configured to cause the processor to:
when the additional event is determined, estimate an amount of data related to the additional event, and
increase a communication band to be allocated to the device to be monitored that monitors the additional event, based on the estimated amount of data related to the additional event.

10. The non-transitory computer readable storage medium according to claim 9, wherein the computer executable instructions are further configured to cause the processor to:
determine whether the predetermined index value exceeds a second threshold that is higher than the preset first threshold; and
when the index value exceeds the second threshold, determine that an anomaly occurs in the device to be monitored related to the event, and output information indicating that the anomaly occurs.

11. The non-transitory computer readable storage medium according to claim 9, wherein the computer executable instructions are further configured to cause the processor to:
determine the additional event by using a preliminarily generated determination table indicating a relationship of the additional event with information indicating a process or a process pair in which the detected event that triggers the enhanced monitoring has occurred and the index value.

* * * * *